US012679637B2

(12) United States Patent
Chen

(10) Patent No.: US 12,679,637 B2
(45) Date of Patent: Jul. 14, 2026

(54) FLEXIBLE STRAP-BASED BAG-CLOSURE MECHANISM FOR TRASH CAN

(71) Applicant: EKO GROUP LTD, Jiangmen (CN)

(72) Inventor: Yizhi Chen, Jiangmen (CN)

(73) Assignee: EKO GROUP LTD, Jiangmen (CN)

( * ) Notice: Subject to any disclaimer, the term of this patent is extended or adjusted under 35 U.S.C. 154(b) by 0 days.

(21) Appl. No.: 19/296,987

(22) Filed: Aug. 12, 2025

(65) Prior Publication Data

US 2025/0368431 A1 Dec. 4, 2025

(30) Foreign Application Priority Data

Oct. 30, 2024 (CN) ......................... 202422654792.6

(51) Int. Cl.
*B65F 1/06* (2006.01)
*B65B 51/30* (2006.01)
*B65F 1/14* (2006.01)
*B65F 1/16* (2006.01)

(52) U.S. Cl.
CPC ............. *B65F 1/062* (2013.01); *B65B 51/30* (2013.01); *B65F 1/06* (2013.01); *B65F 1/14* (2013.01); *B65F 1/16* (2013.01); *B65F 1/1607* (2013.01); *B65F 1/1646* (2013.01); *B65F 2001/1653* (2013.01); *B65F 2210/167* (2013.01)

(58) Field of Classification Search
None
See application file for complete search history.

(56) References Cited

FOREIGN PATENT DOCUMENTS

| | | | | |
|---|---|---|---|---|
| CN | 108557330 A | * | 9/2018 | ............ B65F 1/1415 |
| CN | 110342148 A | * | 10/2019 | ................ B65F 1/14 |
| CN | 106564717 B | | 12/2019 | |
| CN | 114162492 A | * | 3/2022 | ................ B65F 1/14 |

* cited by examiner

*Primary Examiner* — Tanzim Imam

(57) ABSTRACT

A flexible strap-based bag-closure mechanism for a trash can, including a bag-closure main body provided at an opening of the trash can. A middle of the bag-closure main body is provided with a trash inlet. The bag-closure main body is internally provided with a cavity. The cavity is configured as an annular structure surrounding the trash inlet. An inner side of the cavity is provided with an opening communicated with the trash inlet. The bag-closure mechanism further includes a heat-sealing assembly, a limiting block, a flexible strap and a winding roller provided within the cavity. The heat-sealing assembly includes a first arm and a second arm. The first arm includes a connecting end and a hinged end. The second arm is fixedly provided on the bag-closure main body, and is located on a side of the hinged end.

10 Claims, 14 Drawing Sheets

FLEXIBLE STRAP-BASED BAG-CLOSURE MECHANISM FOR TRASH CAN

CROSS-REFERENCE TO RELATED APPLICATIONS

This application claims the benefit of priority from Chinese Patent Application No. 202422654792.6, filed on Oct. 30, 2024. The content of the aforementioned application, including any intervening amendments made thereto, is incorporated herein by reference in its entirety.

TECHNICAL FIELD

This application relates to trash cans, and more particularly to a flexible strap-based bag-closure mechanism for a trash can.

BACKGROUND

Conventional trash cans generally rely on manual closure of garbage bags, which is cumbersome and unhygienic. With the development of science and technology, smart trash cans have emerged in the market. However, most of the existing smart trash cans suffer from complex structures, high energy consumption, and poor efficiency. Particularly in the bag closure stage, problems such as jamming or loose sealing may frequently occur, significantly compromising the user experience.

To improve the level of automation in the trash bagging, trash cans capable of automatically performing bag closure have gradually emerged on the market. These trash cans typically employ one or two pressing rods or plates to press the bag opening against the rim of the trash can, then complete the sealing process through cooperation between a sealing mechanism and the pressing rods or plates. For example, Chinese patent No. 106564717B discloses an automatic bag heat-sealing mechanism and method a trash can, which includes a slider, a clamping plate, a heating module, a driving mechanism for moving the clamping plate toward the heating module, and a frame provided at an opening of the trash can. The heating module is fixedly provided on the frame. Two sides of the frame are each provided with a guide rail. Two sliders are respectively engaged with the two guide rails. The clamping plate is mounted on the two sliders. A bag placement area is provided between the clamping plate and the heating module. The bag placement area is located at the opening of the trash can. When the clamping plate comes into contact with the heating module, an opening of the garbage bag is closed, and at this time, the heating module is activated to melt the opening of the garbage bag, thereby enabling the accurate and efficient sealing of the garbage bag filled with waste.

However, such automatic heat-sealing mechanism still has the following drawbacks in the practical applications.

(1) The mechanism has a complex structure involving multiple components such as the slider, the guide rail, the clamping plate and a synchronous pulley set. The control process is relatively complicated, and the manufacturing cost is high.

(2) The clamping plate and the heating module are rigid, and have a large contact area, which can improve the sealing efficiency to some extent, but will also easily cause overheating to damage the garbage bag, thereby affecting the sealing quality and subsequent handling.

(3) Since garbage bags are typically made of thin and lightweight materials, they are prone to getting stuck at corners of the pressing plates or rods, resulting in sealing failure or even damage to the garbage bag.

(4) Most of the pressing plates or rods have an elongated structure, and the surfaces in contact with the heating module are generally flat, such that the flat surface is prone to deformation once the pressing plate or rod is bent, affecting the contact between the bag and the heating module and further leading to poor sealing effect. As a consequence, the packaging reliability is attenuated.

Therefore, there is an urgent need for a flexible strap-based bag-closure mechanism for a trash can to address the above-mentioned problems.

SUMMARY

An object of the disclosure is to provide a flexible strap-based bag-closure mechanism for a trash can, so as to overcome the aforementioned technical problems in the prior art. By means of the first arm and the second arm, the heat-sealing assembly is enabled to perform a clamping function similar to a clip, thereby effectively facilitating the clamping and closure of the garbage bag. In addition, a winding roller is employed to drive a flexible strap to automatically wind and unwind, thereby greatly simplifying the closure process of the garbage bag. This application eliminates the manual closure operation, resulting in improved convenience and avoiding the contact with the waste in the garbage bag.

Technical solutions of the present disclosure are described as follows.

A flexible strap-based bag-closure mechanism for a trash can, comprising:

a bag-closure main body;

wherein the bag-closure main body is provided at an opening of the trash can; a middle of the bag-closure main body is provided with a trash inlet; the bag-closure main body is internally provided with a cavity; the cavity is configured as an annular structure surrounding the trash inlet; and an inner side of the cavity is provided with an opening communicated with the trash inlet;

the flexible strap-based bag-closure mechanism further comprises a heat-sealing assembly, a limiting block, a flexible strap and a winding roller, and the heat-sealing assembly, the limiting block, the flexible strap and the winding roller are provided within the cavity;

the heat-sealing assembly comprises a first arm and a second arm; the first arm comprises a connecting end and a hinged end; the connecting end is connected to the flexible strap; the hinged end is rotatably connected to the bag-closure main body; and the second arm is fixedly provided on the bag-closure main body, and is located on a side of the hinged end;

the flexible strap is configured to drive the first arm to rotate around the hinged end, so as to clamp the garbage bag with the second arm or to be separated from the second arm; and the winding roller is located on a side of the second arm away from the connecting end; and the flexible strap is drivably connected to the winding roller; the winding roller is configured to rotate to elastically wind or unwind the flexible strap; and the flexible strap is configured to extend from the winding roller, and pass through the limiting block to extend along the opening at the inner side of the cavity to be connected to the connecting end of the first arm.

It should be noted that during a closure process, a length of the flexible strap within the trash inlet is gradually reduced under the driving force of the winding roller, such that the garbage bag is drawn into a heat-sealing region of the heat-sealing assembly. During a reset process, the flexible strap within the trash inlet is released by the winding roller. Under the action of its own elasticity and the driving force of the winding roller, the flexible strap is fully unwound and pressed against an inner wall of the opening of the trash can.

In some embodiments, the cavity comprises a first plate and a second plate respectively provided on an upper side and a lower side of the cavity;

- a peripheral edge of the first plate is configured to extend toward the second plate to form a side plate, or a peripheral edge of the second plate is configured to extend toward the first plate to form the side plate; and
- the first plate, the second plate and the side plate are configured to enclose the cavity.

In some embodiments, the second arm comprises a heat insulation base and a heating element;

- the heating element is configured to perform heat sealing on the garbage bag;
- the heat insulation base is located on the side of the hinged end;
- a side of the heat insulation base facing the garbage bag is provided with a heat-pressing surface; and the heat-pressing surface is arranged in a length direction of the second arm;
- the heating element is provided on the heat-pressing surface; and a side of the first arm facing the garbage bag is provided with a pressing surface configured to clamp against the heat-pressing surface.

In some embodiments, the hinged end is rotatably connected to the first plate; the first arm is provided with a pressing platform extending from the hinged end to the connecting end; and the pressing surface is provided on a side of the pressing platform.

In some embodiments, the bag-closure main body comprises a rotating shaft and a rotating groove; the rotating shaft is provided on the first plate; the first arm is provided with the rotating groove; and the rotating groove is configured to rotate around the rotating shaft;

- the first arm has a 7-shaped structure; an axis of the rotating groove is offset from the pressing platform toward the second arm;
- the second arm is provided with a flange at an end of the heat insulation base away from the hinged end, and the flange is configured to protrude in the length direction of the second arm;
- a height of the flange is less than a height of the heat insulation base;
- the limiting block is provided with a clamping notch configured to allow the flange to pass through;
- the height of the flange is less than a height of the clamping notch;
- the flange is configured to be engaged with the clamping notch to limit movement of the flexible strap; and
- the heating element is a strip-shaped heating wire.

It should be noted that the heat-sealing assembly, except for the heating element, is made of a thermal insulation material, such that heat generated during operation is effectively prevented from being transferred to the external environment, thereby reducing the risk of damaging the garbage bag and the trash can due to overheating.

In some embodiments, the limiting block is provided with a sliding groove configured to allow the flexible strap to pass through; the flexible strap is drivably connected to the limiting block through the sliding groove; the first plate is provided with a guide rail configured for the limiting block to slide; a top of the limiting block is provided with a protrusion slidably connected to the guide rail; and a width of the guide rail is greater than a diameter of the protrusion.

In some embodiments, the flexible strap-based bag-closure mechanism further comprises an elastic part; wherein a first end of the elastic part is fixedly connected to the first plate, and a second end of the elastic part is elastically connected to the protrusion; and an elastic extension direction of the elastic part the same as an extension direction of the guide rail.

It should be noted that the elastic part is a spring. After being stretched, a reaction force is generated by the elastic part, such that the limiting block is driven to move along the guide rail.

In some embodiments, the flexible strap is configured to be clamped into the sliding groove from top to bottom or from bottom to top; and a width of the sliding groove is greater than a thickness of the flexible strap, such that a clearance fit is formed between the flexible strap and the sliding groove.

In some embodiments, the cavity is provided with a track spirally arranged from inside to outside; and an inner side of the track is configured to open to form the opening at the inner side of the cavity.

In some embodiments, the cavity is provided with a support portion. The track is spirally arranged on the support portion from inside to outside. The second plate is configured as the support portion.

In some embodiments, the winding roller is drivably connected to a driving part.

In some embodiments, the driving part is a driving motor configured to directly or indirectly drive the winding roller to rotate.

It should be noted that the winding roller is a toothed belt winding roller. The flexible strap is provided with an embedding portion drivably connected to the winding roller, such that teeth of the toothed belt winding roller can be mated with the embedding portion. As a result, the toothed belt winding roller can more effectively and smoothly drive the flexible strap to reciprocate, thereby preventing the flexible strap from losing control.

Compared to the prior art, the present disclosure has the following beneficial effects.

(1) Regarding the flexible strap-based bag-closure mechanism provided herein, the winding roller is configured to drive the flexible strap to be automatically wound and unwound, thereby significantly simplifying the closure process of the garbage bag. This application eliminates the manual closure operation. During the retraction process, the length of the flexible strap within the trash inlet is gradually reduced under the driving force of the winding roller, such that the garbage bag is drawn toward the heat-sealing region of the heat-sealing assembly. During the reset process, the winding roller releases the length of the flexible strap within the range of the trash inlet. Under the elastic restoring force of the flexible strap and the drive of the winding roller, the flexible strap is fully unwound and adhered to the inner wall of the opening of the trash can. This configuration not only maintains an aesthetically pleasing appearance, but also reduces the number of linkage mechanisms required. As a result, compared with the existing packaging mechanisms in the prior art, the flexible strap-based bag-closure mechanism provided herein requires fewer power sources and features a simpler overall structure.

(2) In addition, compared with sealing structures using pressing rods or plates in conventional trash cans, a clamping mechanism is provided through the design of a first arm and a second arm, enabling the heat-sealing assembly to perform a clamping function similar to a clip, thereby effectively facilitating the clamping and closure of the garbage bag.

(3) Furthermore, the bag-closure main body is provided at the opening of the trash can, enabling compatibility with a wider range of trash can types. By means of a cavity and a limiting block, smoother winding and unwinding of the flexible strap are facilitated, and a more compact structural configuration of the bag-closure main body is achieved.

Figure 1:
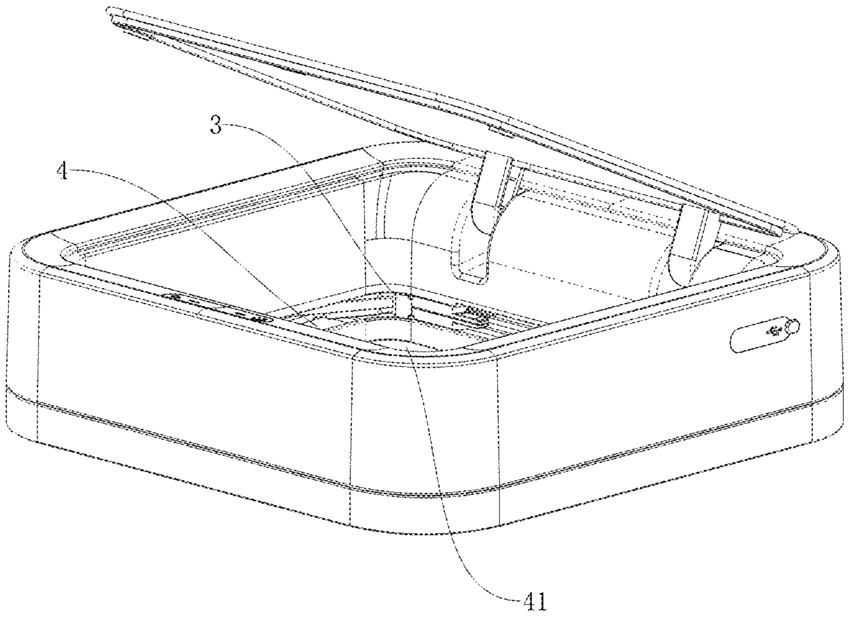
FIG. 1 is a structural diagram of a flexible strap-based bag-closure mechanism for a trash can according to an embodiment of the present disclosure.
Figure 2:
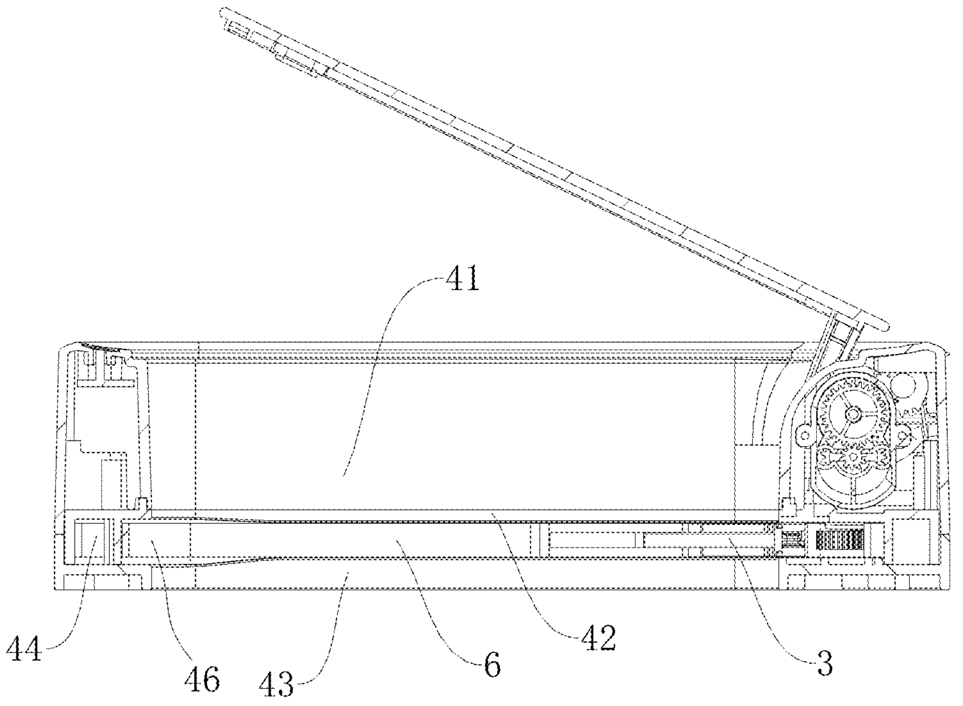
FIG. 2 is a cross-sectional view of the flexible strap-based bag-closure mechanism according to an embodiment of the present disclosure.
Figure 3:
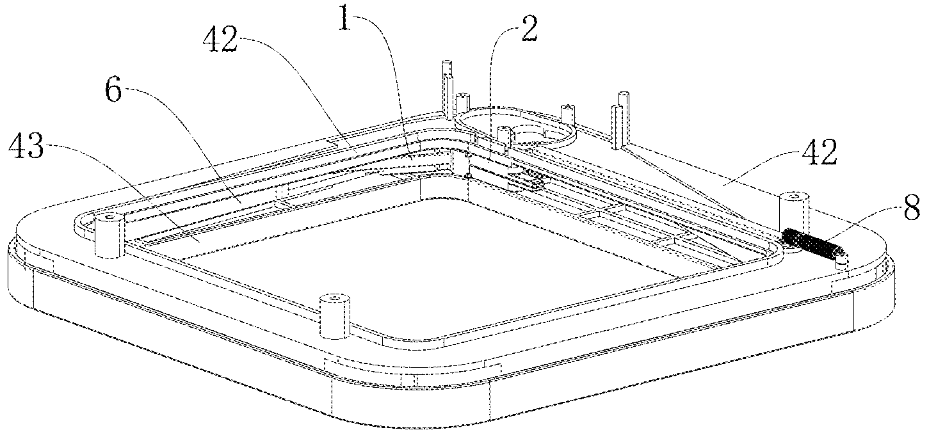
FIG. 3 is a structural diagram of a bag-closure main body according to an embodiment of the present disclosure.
Figure 4:
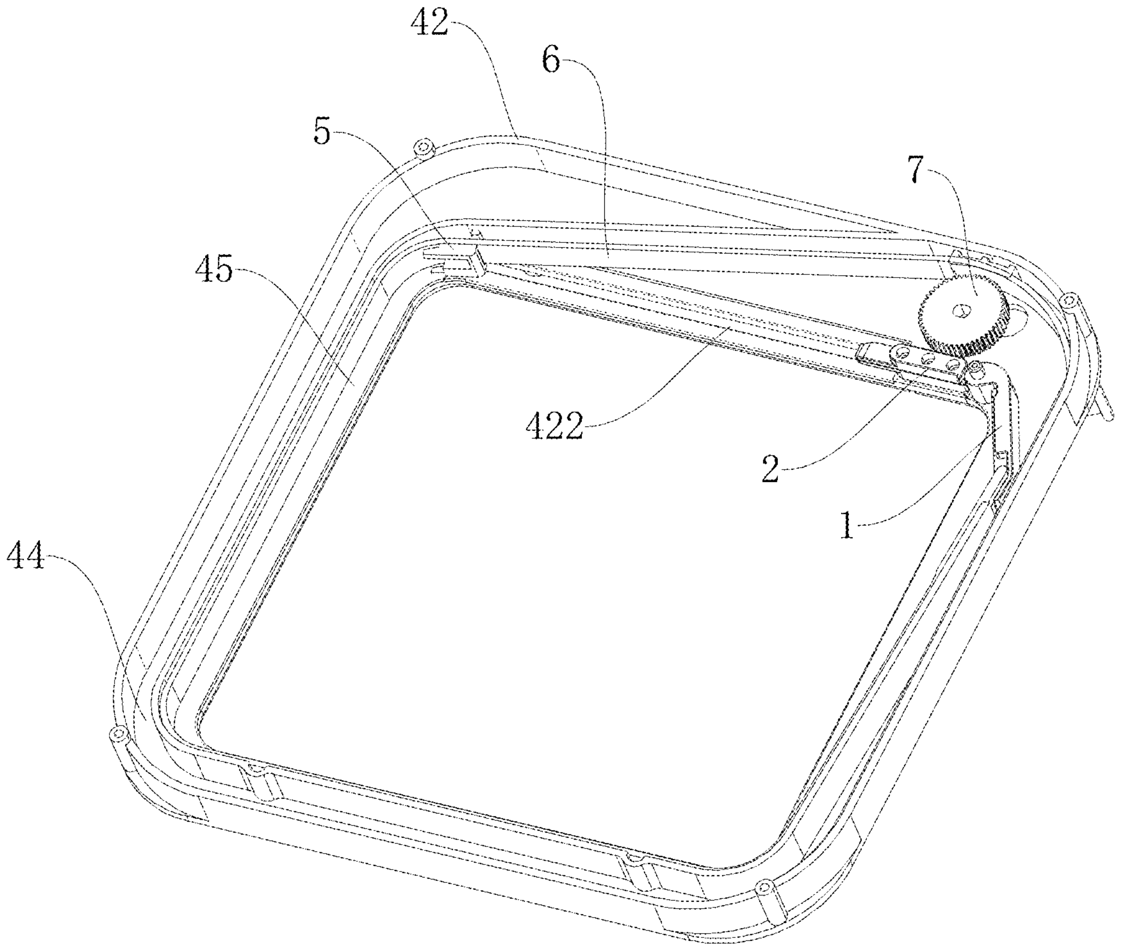
FIG. 4 is a structural diagram of the bag-closure main body with some components removed according to an embodiment of the present disclosure.
Figure 5:
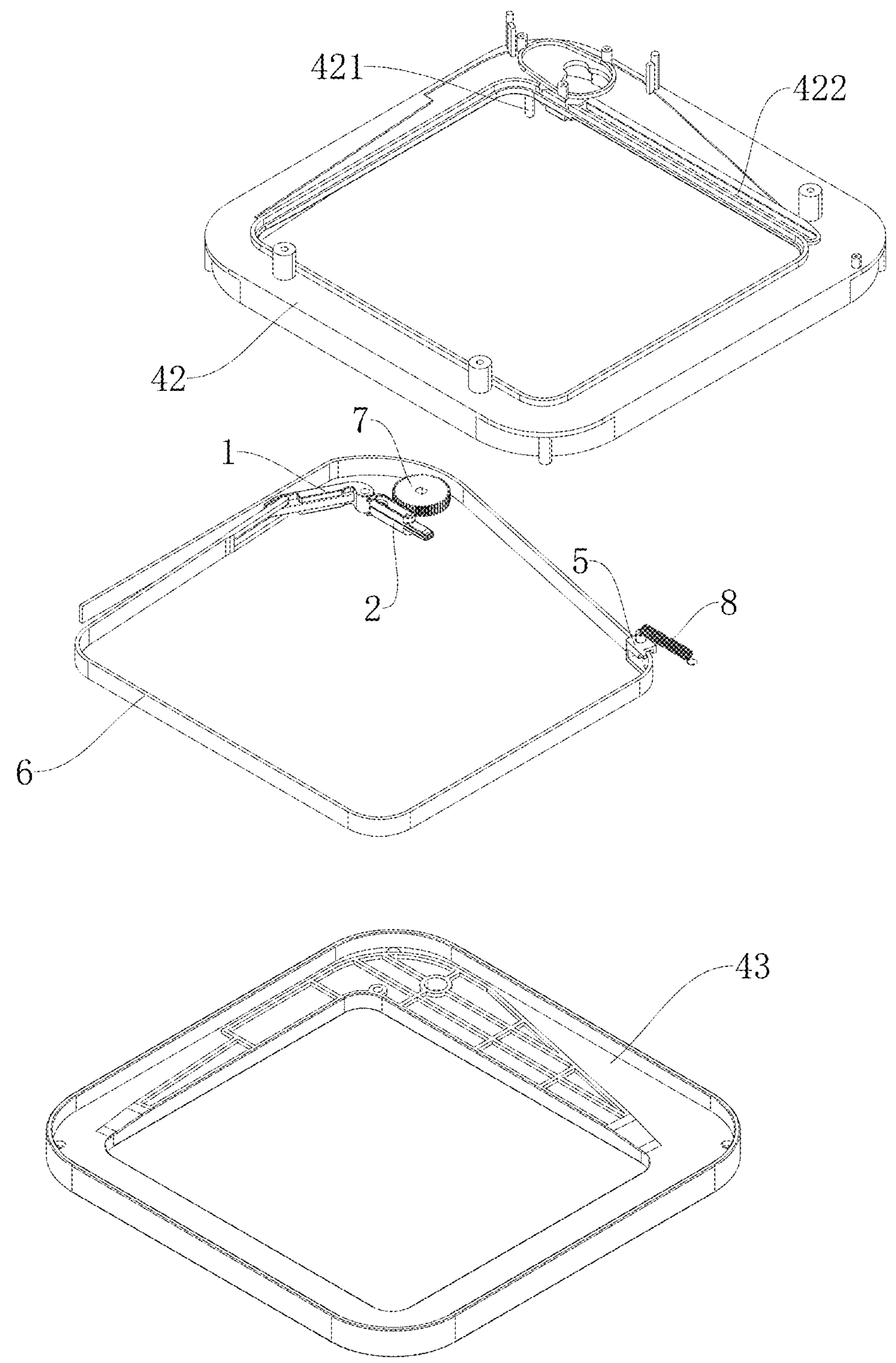
FIG. 5 is an exploded view of the bag-closure main body according to an embodiment of the present disclosure.

In the figures: 1—first arm; 11—pressing platform; 111—pressing surface; 12—rotating groove; 13—angle; 14—avoidance groove; 15—connecting groove; 151—connecting hole; 16—connecting end; 17—hinged end; 2—second arm; 21—heat insulation base; 211—heat-pressing surface; 212—bump; 213—first limiting groove; 214—second limiting groove; 215—mounting groove; 2151—mounting hole; 22—flange; 23—heating element; 24—first end portion; 25—extension portion; 26—second end portion; 3—heat-sealing assembly; 4—bag-closure main body; 41—trash inlet; 42—first plate; 421—rotating shaft; 422—guide rail; 43—second plate; 44—cavity; 45—track; 46—lateral opening; 5—limiting block; 51—sliding groove; 52—protrusion; 53—clamping notch; 6—flexible strap; 7—winding roller; and 8—elastic part.

DETAILED DESCRIPTION OF EMBODIMENTS

The technical solutions in the embodiments of the present disclosure will be described clearly and completely below in conjunction with the accompanying drawings. It is obvious that the described embodiments are merely some embodiments of the present disclosure, instead of all embodiments. Based on the embodiments in the present disclosure, all other embodiments obtained by those of ordinary skill in the art without making creative effort shall fall within the scope of the present disclosure defined by the appended claims.

In the description of the embodiments of the present disclosure, the orientation or position relationship indicated by terms such as “center”, “longitudinal”, “lateral”, “length”, “width”, “thickness”, “up”, “down”, “front”, “rear”, “left”, “right”, “vertical”, ‘horizontal’, “top’, “bottom”, “inner”, “outer”, “clockwise” and “counterclockwise” is based on the those shown in the accompanying drawings. These terms are solely for the convenience of describing the present disclosure, and are not intended to indicate or imply that the devices or components must have specific orientations or be constructed and operated in specific orientations. Therefore, these terms should not be understood as limitations of the present disclosure.

As shown in FIGS. 1-13, an embodiment of the present disclosure provides a flexible strap-based bag-closure mechanism for a trash can, including a bag-closure main body 4. The bag-closure main body 4 is provided at an opening of the trash can. A middle of the bag-closure main body 4 is provided with a trash inlet 41. The bag-closure main body 4 is internally provided with a cavity 44. The cavity 44 is configured as an annular structure surrounding the trash inlet 41. An inner side of the cavity 44 is provided with a lateral opening 46. The lateral opening 46 is communicated with the trash inlet 41.

The flexible strap-based bag-closure mechanism further includes a heat-sealing assembly 3, a limiting block 5, a flexible strap 6, and a winding roller 7. The heat-sealing assembly 3, the limiting block 5, the flexible strap 6, and the winding roller 7 are provided within the cavity 44. The heat-sealing assembly 3 includes a first arm 1 and a second arm 2. The first arm 1 includes a connecting end 16 and a hinged end 17. The connecting end 16 is connected to the flexible strap 6. The hinged end 17 is rotatably connected to the bag-closure main body 4. The second arm 2 is fixedly provided within the cavity 44, and is located on a side of the hinged end 17. The flexible strap 6 is configured to drive the first arm 1 to rotate around the hinged end 17, so as to cause the first arm 1 to rotate with respect to the second arm 2 to open or close. The winding roller 7 is provided on a side of the second arm 2 away from the connecting end 16. The flexible strap 6 is drivably connected to the winding roller 7. The winding roller 7 is configured to rotate about its own axis to elastically wind or unwind the flexible strap 6. The flexible strap 6 is configured to extend from the winding roller 7. The flexible strap 6 is pivotally connected to the limiting block 5. The flexible strap 6 is configured to pass through the limiting block 5 to extend along the lateral opening 46 at the inner side of the cavity 44 to be connected to the connecting end 16 of the first arm 1.

In this embodiment, the winding roller 7 is configured to drive the flexible strap 6 to be automatically wound and unwound, thereby significantly simplifying the closure process of a garbage bag. This application eliminates the need for manual closure, thereby enhancing the convenience and efficiency of trash can usage and helping to prevent the spread of unpleasant odors.

It should be noted that, during a retraction process, the flexible strap 6 is driven by the winding roller 7, and a length of the flexible strap 6 within the trash inlet 41 is gradually reduced, such that the garbage bag is drawn toward a heat-sealing region of the heat-sealing assembly 3. During a reset process, the winding roller 7 releases the length of the flexible strap 6 within a range of the trash inlet 41. Under the action of the elastic restoring force of the flexible strap 6 and the drive of the winding roller 7, the flexible strap 6 is fully unwound and attached to an inner wall of the opening of the trash can. This configuration not only maintains an aesthetically pleasing appearance, but also reduces the number of linkage mechanisms required. Therefore, compared with the existing packaging mechanisms in the prior art, the flexible strap-based bag-closure mechanism provided herein requires fewer power sources and features a simpler overall structure.

Furthermore, compared with the sealing structures of pressing rods or plates in conventional trash cans, the structure of this embodiment is simpler. A clamping mechanism is provided through the design of the first arm 1 and the second arm 2, enabling the heat-sealing assembly 3 to perform a clamping function similar to a clip, thereby effectively facilitating the clamping and closure of the garbage bag.

In addition, the bag-closure main body 4 provided herein is provided at the opening of the trash can, enabling compatibility with a wider range of trash can types. By arranging the limiting block 5 within the cavity 44, the limiting block 5 is driven to move along the cavity 44 during winding of the flexible strap 6. The limiting block 5 prevents deviation of the flexible strap 6, thereby facilitating smoother winding and unwinding of the flexible strap 6 and contributing to a more compact structure of the bag-closure main body 4.

In some embodiments, the bag-closure main body 4 includes a first plate 42 and a second plate 43 respectively provided on an upper side and a lower side of the bag-closure main body 4. A peripheral edge of the first plate 42 is configured to extend toward the second plate 43 to form a side plate, or a peripheral edge of the second plate 43 is configured to extend toward the first plate 42 to form the side plate. The first plate 42, the second plate 43, and the side plate are configured to enclose the cavity 44.

In some embodiments, the second arm 2 includes a heat insulation base 21 and a heating element 23. The heat insulation base 21 is located on the side of the hinged end 17. The heating element 23 is configured to perform heat sealing on a garbage bag. A side of the heat insulation base 21 facing the garbage bag is provided with a heat-pressing surface 211. The heat-pressing surface 211 is arranged in a length direction of the second arm 2. The heating element 23 is arranged on the heat-pressing surface 211. A side of the first arm 1 facing the garbage bag is provided with a pressing surface 111 configured to clamp against the heat-pressing surface 211.

In this embodiment, the first arm 1 rotates about the hinged end 17 as a rotation axis, so as to drive the connecting end 16 to move close to the second arm 2 to clamp against the second arm 2. During this process, the heating element 23 provided on the second arm 2 heats and melts the plastic material of the garbage bag, such that the garbage bag is not only thermally severed, but also partially melted at two sides of the cut due to the material softening caused by high temperature, thereby forming a preliminary seal. Simultaneously, the pressing surface 111 of the first arm 1 and the heat-pressing surface 211 of the second arm 2 are tightly clamped together during heating. The pressure applied ensures that the molten plastic materials are brought into full contact and effectively fused. Subsequently, the plastic is solidified to form a well-sealed closure. The flat configuration of the pressing surface 111 and the heat-pressing surface 211 ensures uniform pressure distribution, preventing local under-pressure that may cause poor fusion. Therefore, the clamping-type heat-sealing assembly structure disclosed herein ensures the integrity and sealing performance of the thermal sealing process. Such a design significantly simplifies the closure process of garbage bag, improves sealing efficiency, and allows for easier operation.

In some embodiments, the second arm 2 further includes two first limiting grooves 213 and a second limiting groove 214. A first one of the two first limiting grooves 213 is provided at an end of the heat insulation base 21 away from a flange 22, and a second one of the two first limiting grooves 213 is provided at an end of the flange 22 away from the first arm 1. The second limiting groove 214 is provided at a middle of the heat-pressing surface 211. Two ends of the second limiting groove 214 are respectively communicated with the two first limiting grooves 213. The two first limiting grooves 213 and the second limiting groove 214 are located in the same plane. The heating element 23 includes a first end portion 24, an extension portion 25 and a second end portion 26 connected in sequence. The first end portion 24 is provided in the first one of the two first limiting grooves 213. The extension portion 25 is configured to extend from an end of the first one of the two first limiting grooves 213 along the second limiting groove 214. The second end portion 26 is provided in the second one of the two first limiting grooves 213.

In some embodiments, the heating element 23 is in a U-shaped.

The heat-pressing surface 211 is provided with two first limiting grooves 213 and the second limiting groove 214 that are communicated, and the heating element 23 is provided within the two first limiting grooves 213 and the second limiting groove 214 to restrict its movement. This configuration prevents the heating element 23 from shifting or bending, which could otherwise result in incomplete fusing and sealing of the garbage bag. In addition, by means of the heat insulation base 21, the heating element 23 provided within the two first limiting grooves 213 and the second limiting groove 214, heat generated by the heating element 23 is prevented from dissipating through the heat insulation base 21. As a result, the heat is effectively concentrated and uniformly applied to the garbage bag, thereby reducing the risk of heat loss or localized overheating.

In some embodiments, a top of the heat insulation base 21 is provided with a mounting groove 215. A bottom of the heat insulation base 21 is provided with a mounting hole 2151. The mounting hole 2151 is communicated with the mounting groove 215. The first plate 42 is provided with a mounting portion and a fastener. The mounting portion is provided in the mounting groove 215. The fastener is configured to extend sequentially through the mounting portion and the mounting hole 2151 to achieve fixation.

By means of the mounting groove 215 and the mounting hole 2151, the second arm 2 is further secured to ensure structural stability, thereby preventing inadequate heat sealing of the garbage bag that may otherwise result from loosening or displacement of the second arm 2.

In some embodiments, the hinged end 17 is rotatably connected to the first plate 42. The connecting end 16 is connected to the flexible strap 6. The first arm 1 is provided with a pressing platform 11 extending from the hinged end 17 to the connecting end 16. The pressing surface 111 is provided on a side of the pressing platform 11.

In some embodiments, the bag-closure main body 4 includes a rotating shaft 421 and a rotating groove 12. The rotating shaft 421 is provided on the first plate 42. The hinged end 17 of the first arm 1 is provided with the rotating groove 12. The rotating groove 12 is configured to extend through the hinged end 17 in a height direction of the hinged end 17. The rotating shaft 421 is pivotally connected to the rotating groove 12. The rotating groove 12 is configured to rotate around the rotating shaft 421. The flexible strap 6 is configured to drive the first arm 1 to rotate about an axis of the rotating groove 12.

The first arm 1 has a 7-shaped structure. The axis of the rotating groove 12 is offset from the pressing platform 11 toward the second arm 2. An angle 13 is formed between the pressing surface 111 and a plane passing through the axis of the rotating groove 12. The angle 13 is 90°.

In some embodiments, the second arm 2 further includes two bumps 212. The two bumps 212 are provided at an end of the heat insulation base 21 close to the hinged end 17. Each of the two bumps 212 is configured to protrude out of the heat-pressing surface 211. The two bumps 212 are arranged in a vertically symmetrical manner. An upper end and a lower end of the first arm 1 close to the angle 13 is provided with two avoidance grooves 14 corresponding to the two bumps 212. The two avoidance grooves 14 are symmetrically arranged above and below on two sides of the pressing platform 11.

In this embodiment, the design of the two bumps 212 and the two avoidance grooves 14 can prevent the garbage bag from becoming stuck in the gap between the first arm 1 and the second arm 2, thereby ensuring complete heat sealing of the garbage bag.

In some embodiments, during the retraction process, the trash bag enters the pressing platform 11. By respectively providing the two bumps 212 at upper and lower ends of the heat insulation base 21 and the two avoidance grooves 14 at the upper and lower ends of the first arm 1, the garbage bag is effectively limited within the area of the pressing platform 11, thereby preventing overflow and ensuring full coverage of the sealing region to avoid incomplete fusing at the bag edges.

The connecting end 16 of the first arm 1 is provided with two connecting grooves 15. The two connecting grooves 15 are arranged symmetrically on an upper side and a lower side of the pressing platform 11. The pressing platform 11 is provided with a connecting hole 151 configured to extend through an upper surface and a lower surface of the pressing platform 11. The two connecting grooves 15 are in communication with each other through the connecting hole 151. The flexible strap 6 is connected to the first arm 1 through the connecting hole 151, so as to drive the first arm 1 to rotate.

In some embodiments, the second arm 2 is provided with the flange 22 at an end of the heat insulation base 21 away from the hinged end 17. The flange 22 is configured to protrude in the length direction of the second arm 2. A height of the flange 22 is less than that of the heat insulation base 21. The limiting block 5 is provided with a clamping notch 53 configured to allow the flange 22 to pass through. A height of the flange 22 is less than a height of the clamping notch 53. When the flange 22 is fully engaged with the clamping notch 53, the flexible strap 6 is restricted from moving.

In some embodiments, the flange 22 is provided with a pointed tip to facilitate insertion into the clamping notch 53.

The design of the flange 22 and the clamping notch 53 ensures that when the limiting block 5 is connected to the heat-sealing assembly 3, the garbage bag tightened by the flexible strap 6 is entirely positioned within the heat-sealing range of the heat-sealing assembly, thereby further improving the sealing effect and preventing bag leakage during sealing.

In some embodiments, the heating element 23 is a strip-shaped heating wire. The second limiting groove 214 is arranged in the length direction of the second arm 2. When the heating element 23 is provided within the second limiting groove 214, the heating element 23 is configured to partially protrude out of the heat-pressing surface 211.

It should be noted that, except for the heating element 23, the heat-sealing assembly 3 is made of a heat-insulating material, which effectively prevents heat generated during operation from dissipating to the external environment, thereby reducing damage to the garbage bag and trash can caused by overheating.

In some embodiments, the limiting block 5 is provided with a sliding groove 51 configured to allow the flexible strap 6 to pass through. The flexible strap 6 is drivably connected to the limiting block 5 through the sliding groove 51. The first plate 42 is provided with a guide rail 422 configured for the limiting block 5 to slide. A top of the limiting block 5 is provided with a protrusion 52 slidably connected to the guide rail 422. A width of the guide rail 422 is greater than a diameter of the protrusion 52.

The sliding groove 51 is designed to allow the flexible strap 6 to pass through smoothly, thereby facilitating the automatic winding and unwinding of the flexible strap 6. In addition, the limiting block 5 is designed to guide the flexible strap 6 into the heat-sealing region of the heat-sealing assembly 3, thereby preventing issues such as incomplete sealing or bag leakage.

In some embodiments, the flexible strap-based bag-closure mechanism further includes an elastic part 8. A first end of the elastic part 8 is fixedly connected to the first plate 42, and a second end of the elastic part 8 is elastically connected to the protrusion 52. An elastic extension direction of the elastic part 8 the same as an extension direction of the guide rail 422.

It should be noted that the elastic part 8 is a spring. A restoring force is generated after the elastic part 8 is stretched, which drives the limiting block 5 to move along the guide rail 422.

In this embodiment, the flexible strap 6 is configured to be clamped into the sliding groove 51 from top to bottom or from bottom to top. A width of the sliding groove 51 is greater than a thickness of the flexible strap 6, such that a clearance fit is formed between the flexible strap 6 and the sliding groove 51.

When the flexible strap 6 and the sliding groove 51 are in a clearance fit, a movement speed of the flexible strap 6 during tightening is greater than that of the limiting block 5. Since the flexible strap 6 and the limiting block 5 move in synchronization, the movement stroke of the limiting block 5 is effectively shortened while still fulfilling its guiding function. This configuration reduces the structural volume of the limiting block 5 and saves installation space.

In some embodiments, the cavity 44 is provided with a track 45 spirally arranged from inside to outside. An inner side of the track 45 is configured to open to form the lateral opening 46 at the inner side of the cavity 44. When in an unwound state, the flexible strap 6 is provided within the track 45.

In some embodiments, the cavity 44 is provided with a support portion. The track 45 is spirally arranged on the support portion from inside to outside. The second plate 43 is configured as the support portion.

In this embodiment, the track 45 is configured to constrain the flexible strap 6 during the closure process of the garbage bag. The flexible strap 6 is pivotally connected to the sliding groove 51, allowing the flexible strap 6 to be smoothly wound or unwound within the inner side of the track 45, thereby preventing deviation during movement.

The winding roller 7 is drivably connected to a driving part. In some embodiments, the driving part is a driving motor configured to directly or indirectly drive the winding roller 7 to rotate.

It should be noted that the winding roller 7 is a toothed belt winding roller. The flexible strap 6 is provided with an embedding portion drivably connected to the winding roller 7, so as to ensure that the teeth on the toothed belt winding roller engage with the embedding portion. This configuration allows the toothed belt winding roller to more effectively and smoothly drive the flexible strap 6 to reciprocate, thereby preventing the flexible strap 6 from getting out of control.

Figure 6:
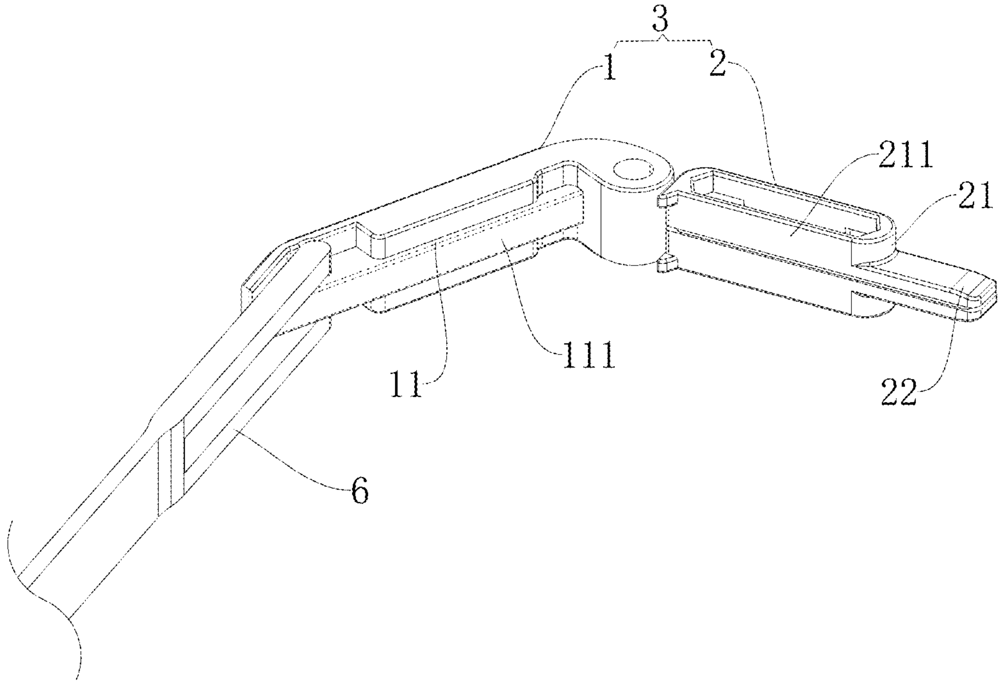
FIG. 6 is a structural diagram of a heat-sealing assembly according to an embodiment of the present disclosure in an open state.
Figure 7:
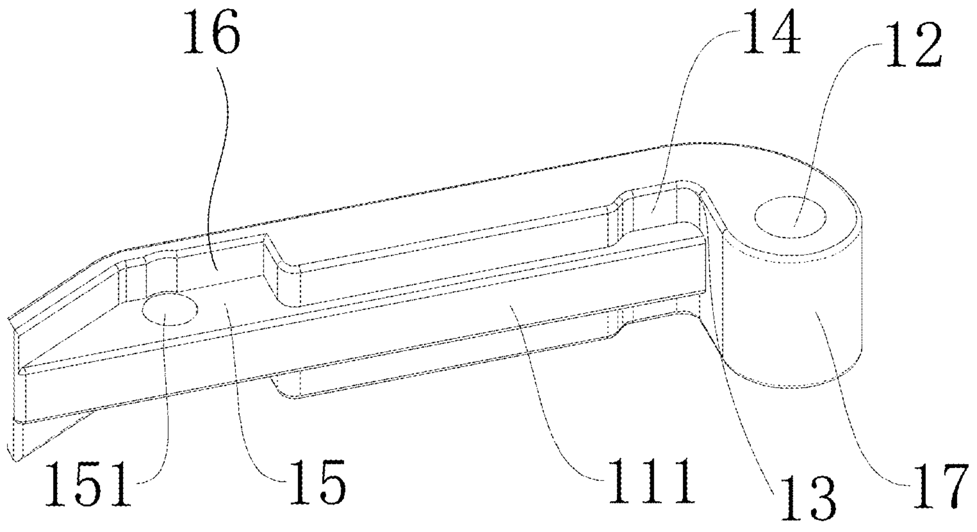
FIG. 7 is a structural diagram of a first arm according to an embodiment of the present disclosure.
Figure 8:
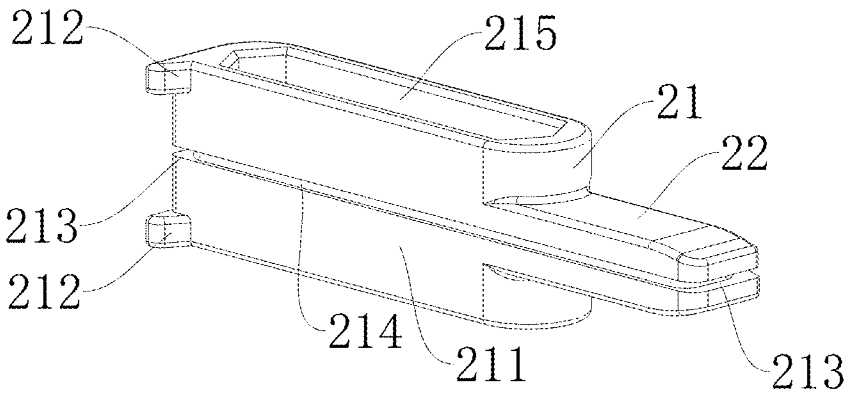
FIG. 8 is a structural diagram of a second arm according to an embodiment of the present disclosure.
Figure 9:
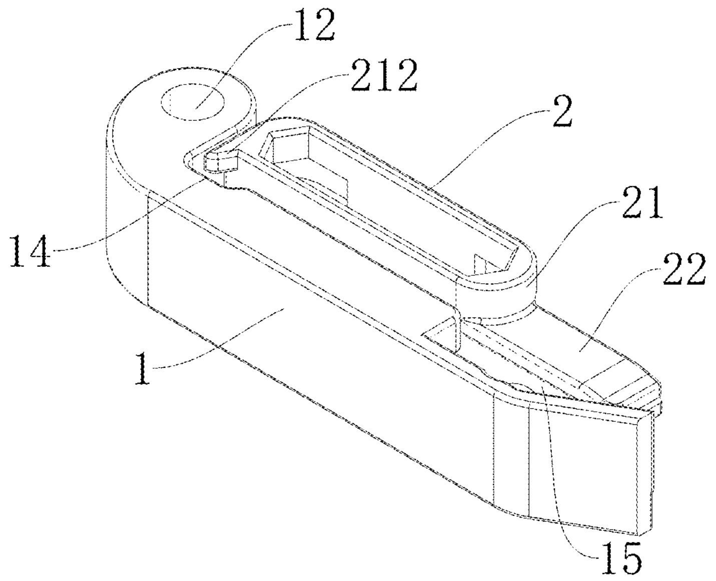
FIG. 9 is a structural diagram of the heat-sealing assembly according to an embodiment of the present disclosure in a clamping state.
Figure 10:
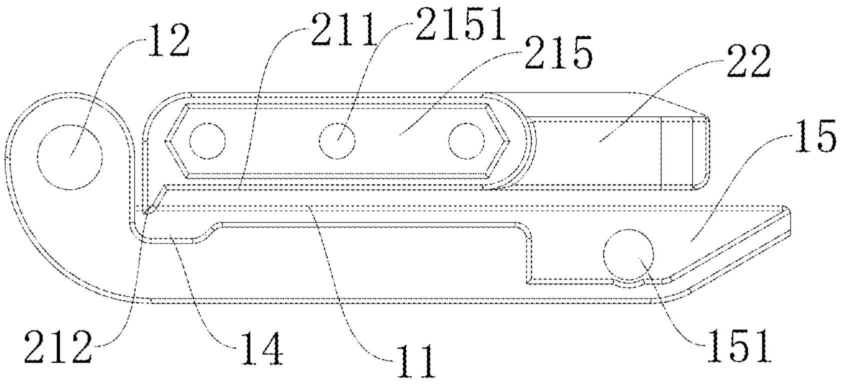
FIG. 10 is a top view of the heat-sealing assembly according to an embodiment of the present disclosure in the clamping state.
Figure 11:
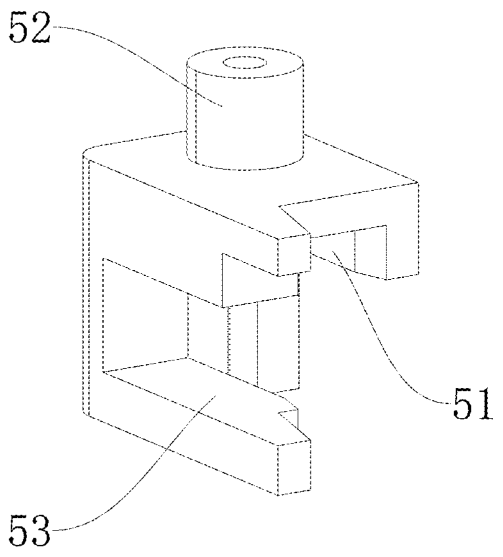
FIG. 11 is a structural diagram of a limiting block according to an embodiment of the present disclosure.
Figure 12:
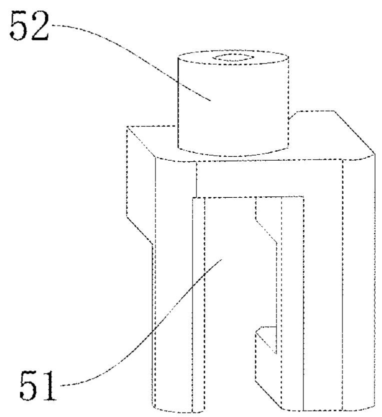
FIG. 12 is a structural diagram of the limiting block from another perspective according to an embodiment of the present disclosure.
Figure 13:
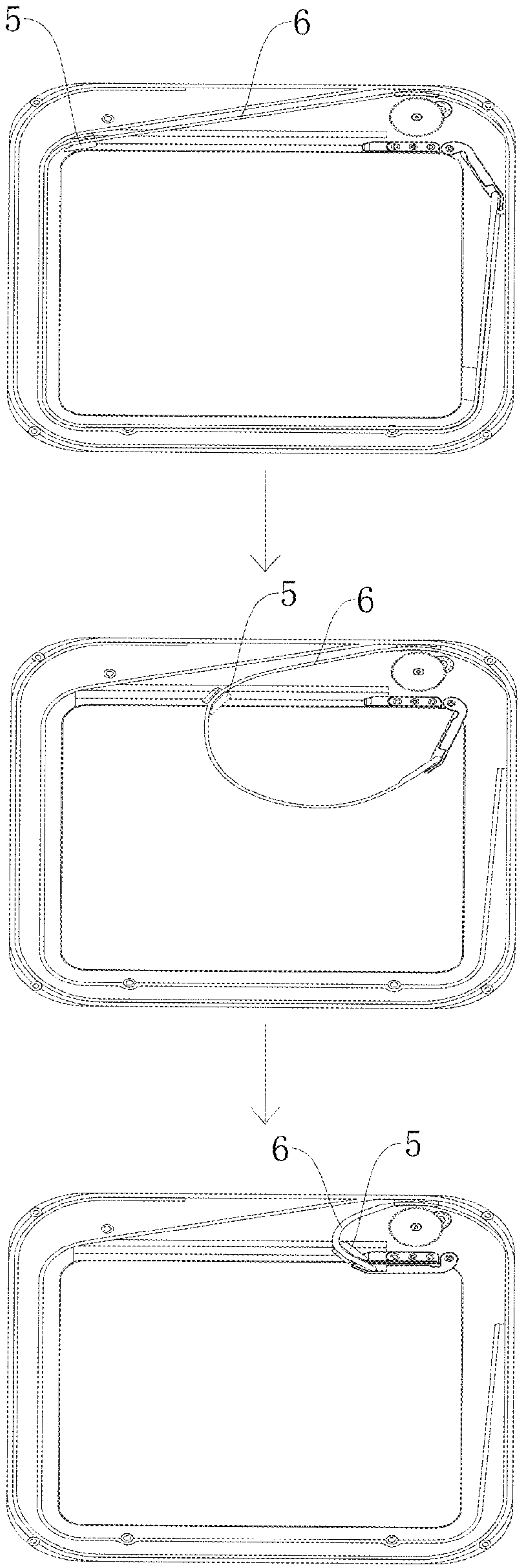
FIG. 13 is a schematic diagram illustrating winding of a flexible strap according to an embodiment of the present disclosure.
Figure 14:
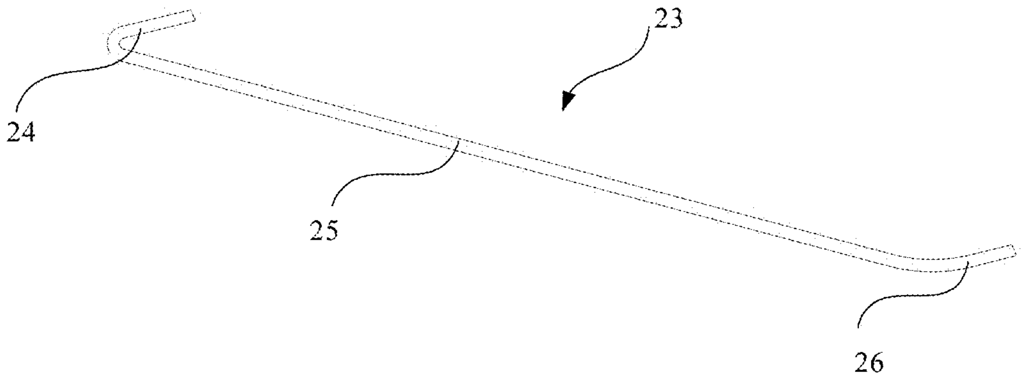
FIG. 14 is a structural diagram of a heating element according to an embodiment of the present disclosure.

As shown in FIGS. 6 and 13, the flexible strap-based bag-closure mechanism provided herein operates as follows. The driving part drives the winding roller 7 to rotate, so as to drives the flexible strap 6 to move from the inner side of the track 45 toward the heat-sealing assembly 3. An opening of the filled garbage bag is closed toward the heat-sealing assembly 3 by the flexible strap 6. Under the action of the driving force of the flexible strap 6, the first arm 1 rotates around the rotating shaft 421, so as to drive the connecting end 16 to move close to the second arm 2 to clamp against the second arm 2. The pressing surface 111 clamps the garbage bag's opening against the heat-pressing surface 211. The opening of the trash-filled garbage bag is heat-sealed by the heating wire and separated from the remaining garbage bag. Meanwhile, the sealed end of the filled garbage bag is heat-sealed together, and the bottom end of the remaining garbage bag is also heat-sealed to form a new bottom.

The driving part drives the winding roller 7 to rotate in a reverse direction. The winding roller 7 drives the flexible strap 6 to unwind, and the flexible strap 6 drives the first arm 1 to rotate in reverse around the rotating shaft 421 to return to its original position. The flange 22 is disengaged from the clamping notch 53, and the second arm 2 is separated from the limiting block 5. Simultaneously, the flexible strap 6 gradually unfolds along the track 45, and the opening of the garbage bag is released as the pressing force is removed.

Described embodiments are merely illustrative, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A flexible strap-based bag-closure mechanism for a trash can, comprising:

a bag-closure main body;

wherein the bag-closure main body is provided at an opening of the trash can; a middle of the bag-closure main body is provided with a trash inlet; the bag-closure main body is internally provided with a cavity; the cavity is configured as an annular structure surrounding the trash inlet; and an inner side of the cavity is provided with an opening communicated with the trash inlet;

the flexible strap-based bag-closure mechanism further comprises a heat-sealing assembly, a limiting block, a flexible strap and a winding roller, and the heat-sealing assembly, the limiting block, the flexible strap and the winding roller are provided within the cavity;

the heat-sealing assembly comprises a first arm and a second arm; the first arm comprises a connecting end and a hinged end; the connecting end is connected to the flexible strap; the hinged end is rotatably connected to the bag-closure main body; and the second arm is fixedly provided on the bag-closure main body, and is located on a side of the hinged end;

the flexible strap is configured to drive the first arm to rotate around the hinged end to clamp a garbage bag with the second arm or to be separated from the second arm; and the winding roller is located on a side of the second arm away from the connecting end; and the flexible strap is drivably connected to the winding roller; the winding roller is configured to rotate to elastically wind or unwind the flexible strap; and the flexible strap is configured to extend from the winding roller, and pass through the limiting block to extend along the opening at the inner side of the cavity to be connected to the connecting end of the first arm.

2. The flexible strap-based bag-closure mechanism according to claim 1, wherein the cavity comprises a first plate and a second plate respectively provided on an upper side and a lower side of the cavity;

a peripheral edge of the first plate is configured to extend toward the second plate to form a side plate, or a peripheral edge of the second plate is configured to extend toward the first plate to form the side plate; and the first plate, the second plate and the side plate are configured to enclose the cavity.

3. The flexible strap-based bag-closure mechanism according to claim 2, wherein the second arm comprises a heat insulation base and a heating element;

the heating element is configured to perform heat sealing on the garbage bag;

the heat insulation base is located on the side of the hinged end;

a side of the heat insulation base facing the garbage bag is provided with a heat-pressing surface; and the heat-pressing surface is arranged in a length direction of the second arm;

the heating element is provided on the heat-pressing surface; and a side of the first arm facing the garbage bag is provided with a pressing surface configured to clamp against the heat-pressing surface.

4. The flexible strap-based bag-closure mechanism according to claim 3, wherein the hinged end is rotatably connected to the first plate; the first arm is provided with a pressing platform extending from the hinged end to the connecting end; and the pressing surface is provided on a side of the pressing platform.

5. The flexible strap-based bag-closure mechanism according to claim 4, wherein the bag-closure main body comprises a rotating shaft and a rotating groove; the rotating shaft is provided on the first plate; the first arm is provided with the rotating groove; and the rotating groove is configured to rotate around the rotating shaft;

the first arm has a 7-shaped structure; and an axis of the rotating groove is offset from the pressing platform toward the second arm;
the second arm is provided with a flange at an end of the heat insulation base away from the hinged end, and the flange is configured to protrude in the length direction of the second arm;
a height of the flange is less than a height of the heat insulation base;
the limiting block is provided with a clamping notch configured to allow the flange to pass through;
the height of the flange is less than a height of the clamping notch;
the flange is configured to be engaged with the clamping notch to limit movement of the flexible strap; and
the heating element is a strip-shaped heating wire.

6. The flexible strap-based bag-closure mechanism according to claim 2, wherein the limiting block is provided with a sliding groove configured to allow the flexible strap to pass through; the flexible strap is drivably connected to the limiting block through the sliding groove; the first plate is provided with a guide rail configured for the limiting block to slide; a top of the limiting block is provided with a protrusion slidably connected to the guide rail; and a width of the guide rail is greater than a diameter of the protrusion.

7. The flexible strap-based bag-closure mechanism according to claim 6, further comprising:
an elastic part;
wherein a first end of the elastic part is fixedly connected to the first plate, and a second end of the elastic part is elastically connected to the protrusion; and an elastic extension direction of the elastic part is the same as an extension direction of the guide rail.

8. The flexible strap-based bag-closure mechanism according to claim 6, wherein the flexible strap is configured to be clamped into the sliding groove from top to bottom or from bottom to top; and a width of the sliding groove is greater than a thickness of the flexible strap, such that a clearance fit is formed between the flexible strap and the sliding groove.

9. The flexible strap-based bag-closure mechanism according to claim 1, wherein the cavity is provided with a track spirally arranged from inside to outside; and an inner side of the track is configured to open to form the opening at the inner side of the cavity.

10. The flexible strap-based bag-closure mechanism according to claim 1, wherein the winding roller is drivably connected to a driving part; the winding roller is a toothed belt winding roller, and the flexible strap is provided with an embedding portion drivably connected to the winding roller.

* * * * *